(12) United States Patent
Gomes et al.

(10) Patent No.: US 8,341,049 B2
(45) Date of Patent: Dec. 25, 2012

(54) METHOD FOR CONTROLLING FEATURE UPGRADES

(75) Inventors: A. Ferdinand Gomes, Novi, MI (US); Philip Stoll, Ann Arbor, MI (US); Ameya Vasani, Johnson City, NY (US)

(73) Assignee: Burroughs Payment Systems, Inc., Plymouth, MI (US)

( * ) Notice: Subject to any disclaimer, the term of this patent is extended or adjusted under 35 U.S.C. 154(b) by 678 days.

(21) Appl. No.: 12/319,055

(22) Filed: Dec. 31, 2008

(65) Prior Publication Data

US 2010/0169200 A1 Jul. 1, 2010

(51) Int. Cl.
*G06Q 40/00* (2012.01)
(52) U.S. Cl. ............. 705/35; 717/172; 705/65
(58) Field of Classification Search .......... 705/1–68; 717/1–172; 709/1–223
See application file for complete search history.

(56) References Cited

U.S. PATENT DOCUMENTS

2008/0140574 A1* 6/2008 Boucher et al. .......... 705/65

OTHER PUBLICATIONS

D. Kirchgesler, VA Funding Fee Payment System v2.5 Users Guide, Apr. 23, 2007, Treasury Financial Management Service, web, 1-33.*

* cited by examiner

*Primary Examiner* — Marissa Liu
(74) *Attorney, Agent, or Firm* — Honigman Miller Schwartz and Cohn LLP

(57) ABSTRACT

A method for controlling feature upgrades on a plurality of payment system devices, onsite, in a distributed network, involves a web service at each of the plurality of payment system devices. An upgrade utility program communicates with the web service at each of the plurality of payment system devices, and presents a list of available payment system devices to the user. The list of available payment system devices identifies each device by location. A group of payment system devices is selected for receiving feature upgrades, and for each payment system device in the selected group, at least one feature upgrade is selected. A request file is created that contains information indicative of the payment system devices selected for receiving feature upgrades and indicative of the at least one feature upgrade for each selected payment system device.

13 Claims, 4 Drawing Sheets

METHOD FOR CONTROLLING FEATURE UPGRADES

BACKGROUND OF THE INVENTION

1. Field of the Invention

The invention relates to payment system devices, and to hardware function or feature upgrades on payment system devices. The invention further relates to a method for controlling feature upgrades on single or multiple units' hardware features onsite in a distributed network, without requiring a user to have knowledge of the specific serial numbers when placing upgrade feature orders. The invention further relates to document processing, and to compact, desktop document processors for capturing data and images from checks and other financial and payment-related documents. The invention further relates to document processors designed for processing documents at a teller window.

2. Background Art

Historically, banks processed large volumes of paper checks in centralized locations, either a central bank or a clearing house. Document processing machines in such locations were large, processing up to 2000 documents per minute. These machines were supported by dedicated, trained operators.

However, centralized processing costs banks typically three days in clearing a document. The "Check Clearing for the 21st Century Act" or the "Check 21 Act" was enacted by Congress to facilitate check truncation by authorizing substitute checks, to foster innovation in the check collection system without mandating receipt of checks in electronic form, and to improve the overall efficiency of the Nation's payments system. The Check 21 legislation has driven the demand for decentralized check imagers and sorters in financial institutions. Check 21 gives equal legal validity to electronic data obtained from documents, and has made it possible for banks to distribute document processing to speed the clearing process. Check 21 has made it advantageous for banks to convert paper checks to electronic data as early as possible.

In the recent past, banks have partially converted paper check information to electronic data. In some cases this partial information was used internally. In other cases two banks would agree on standards for electronic data transfer. In either case, the paper check was still the only legal document for the transaction. Check 21 has standardized these agreements across the banking industry, and given the electronic data legal merit, if the electronic data meet the requirements set forth in Check 21.

Accordingly, the use of decentralized payment system devices is increasing. Because it is advantageous for banks to convert paper checks to Check 21 valid electronic data as early as possible, compact, desktop document processors have been developed. Some of these payment system devices are designed for use on a counter top, or at a teller window. With the growing use of decentralized payment system devices in the field, the management of these payment system devices may become complicated.

For example, an existing payment system device may be capable of receiving a hardware function or feature upgrade, with the upgrade being enabled by providing the payment system device with an appropriate authorization. There is a need to be able to upgrade the payment system device in the field. A feature upgrade could include, for example, various speed and document hopper related options, and enabling options, such as, color imaging, color printing, and optical character recognition (OCR), or any other option that the device is capable of supporting.

In an existing approach to authorizing a hardware function or feature upgrade, the customer or user of the payment system provides the device serial number together with order information, for example, by email, to the authorization service. The existing approach only allows modifying a single device's features at a time. In response, an authorization file is created that contains entitlement information for the particular payment system device having the provided serial number. A computer program on a personal computer (PC) that is locally connected to the payment system device is used to update or upgrade the device in accordance with the provided authorization file.

As the number of payment system devices for a customer increases, this existing, tedious upgrade process can become difficult to manage. In particular, the requirement for the customer or user to know or provide a unit's serial number at the time of ordering the upgrade makes it difficult to manage devices, particularly when the customer has many payment system devices that are decentralized, and possibly located at various physical locations.

For the foregoing reasons, there is a need for an improved method for controlling feature upgrades on single or multiple units' hardware features onsite in a distributed network, without requiring a user to have knowledge of the specific serial numbers when placing upgrade feature orders, and without requiring a user to physically move a device to upgrade its features.

SUMMARY OF THE INVENTION

It is an object of the invention to provide a method for controlling feature upgrades on single or multiple units' hardware features onsite in a distributed network, without requiring a user to have knowledge of the specific serial numbers when placing upgrade feature orders.

Some embodiments of the invention allow a user to purchase a feature upgrade style without having to know or provide the unit's serial number at the time of purchase, but allow the user to select the unit (locally or remotely on a network) to apply the style to, at a later stage, in situ.

In one embodiment of the invention, a method for controlling feature upgrades on a plurality of payment system devices, onsite, in a distributed network, is provided. The method comprises providing a web service at each of the plurality of payment system devices, and providing an upgrade utility program configured to communicate with the web service at each of the plurality of payment system devices.

The upgrade utility program is utilized to communicate with the plurality of payment system devices and present a list of available payment system devices to the user. The list of available payment system devices identifies each device by location. The user selects a group of payment system devices for receiving feature upgrades, and for each payment system device in the selected group, selects at least one feature upgrade. Each device in any given single upgrade request could have different sets of upgrades.

The utility upgrade program creates a request file. The request file contains information indicative of the payment system devices selected for receiving feature upgrades and indicative of the at least one feature upgrade for each selected payment system device.

In more detail, in one embodiment of the invention, the request file is sent to an entitlement system. A response file is generated and contains information indicative of the payment system devices selected for receiving feature upgrades and indicative of entitlements for the at least one feature upgrade for each selected payment system device. The response file is provided to the user.

In an additional aspect of the invention, in order to apply the entitlements, the upgrade utility program is utilized to communicate with the plurality of payment system devices and apply the entitlements for the at least one feature upgrade for each selected payment system device in accordance with the response file. The entitlements may include hardware feature upgrades supported by the payment system devices. A hardware feature upgrade is enabled for a payment system device upon application of a corresponding entitlement.

The hardware feature upgrades may take many forms. For example, a hardware feature upgrade may be for a processing speed option, document hopper option, color imaging, color printing, or optical character recognition.

In some embodiments of the invention, initially, the user sends an upgrade order to the entitlement system, with the upgrade order containing information indicative of at least one feature upgrade. The entitlement system may send an acknowledgment to the user in response to receiving the upgrade order. In turn, upon receiving the request file at the entitlement system, the entitlement system processes the request file and the upgrade order to produce the response file. The initial upgrade order may indicate feature upgrades without specifying any corresponding payment system devices. It is appreciated that the user may send the order to an order system that conveys upgrade orders placed by the user to the entitlement system, and need not directly send the order to the entitlement system.

There are many advantages associated with embodiments of the invention. For example, the user may focus on payment system device location instead of being required to specify serial numbers for the payment system devices to be upgraded.

DETAILED DESCRIPTION OF THE PREFERRED EMBODIMENTS

Figure 1:
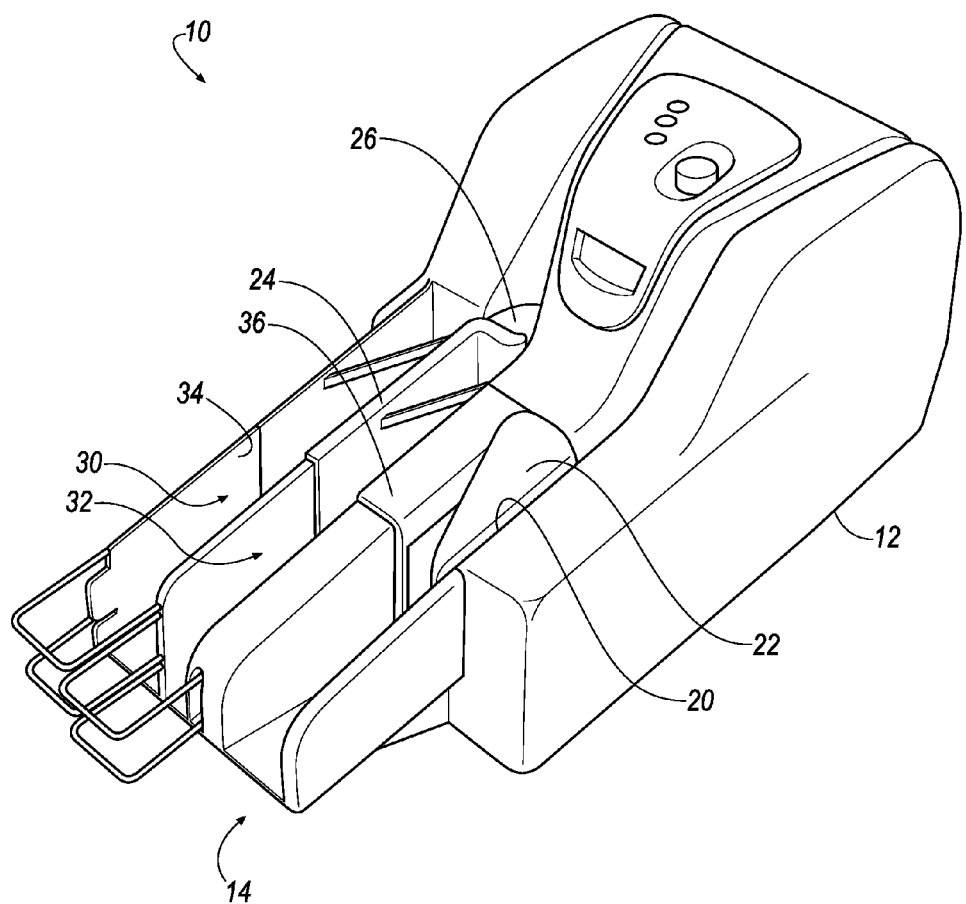
FIG. 1 illustrates a compact, desktop document processor for which embodiments of the invention may be used to control feature upgrades.

As shown in FIG. 1, a compact, desktop document processor is generally indicated at 10. The apparatus 10 includes base unit 12, and input hopper 14 for receiving a batch of checks to be processed. In general, apparatus 10 is used for decentralized document processing applications. The input hopper 14 provides the operator with an area to place a stack of documents to be processed, supports longer documents, and assists with document alignment.

The apparatus 10 may be constructed to perform any number of known document processing actions as appreciated by one of ordinary skill in the art. Suitable electronics and mechanical mechanisms are located within base unit 12. For example, apparatus 10 may perform front and rear image capture, magnetic ink character recognition (MICR) reading, optical character recognition (OCR) reading, endorsing, and/or bar code reading depending on the application. Advantageously, the electronics and mechanical mechanisms required for the document processing actions are provided within base unit 12 as readily understood by one of ordinary skill in the art. The apparatus may be provided with a suitable network connection interface such as Ethernet or Universal Serial Bus (USB).

Input hopper 14 is an automatic, hands-off device that will feed a batch of checks into the base unit 12. Input hopper 14 receives and holds a batch of checks between side wall portion 20 and spring-loaded flag 22 which presses up against the last document in the loaded batch to keep the checks together. It is appreciated that apparatus 10 is suitable for processing checks as well as other financial and payment-related documents.

Divider element 24 includes a pocket selector 26 that allows checks to be sorted into, as shown, two pockets based on criteria such as high value amounts, image quality, reader rejects, and others. The pockets include first and second pockets 30 and 32, respectively. First pocket 30 is bound by side wall 34 of input hopper 14, and divider element 24. Second pocket 32 is bound by divider element 24 and wall 36.

Embodiments of the invention relate to controlling feature upgrades on single or multiple units' hardware features, onsite, in a distributed network, without requiring a user to have knowledge of the specific serial numbers when placing upgrade feature orders. The apparatus 10 is an example of a document processor for which embodiments of the invention may be used to control feature upgrades.

Figure 2:
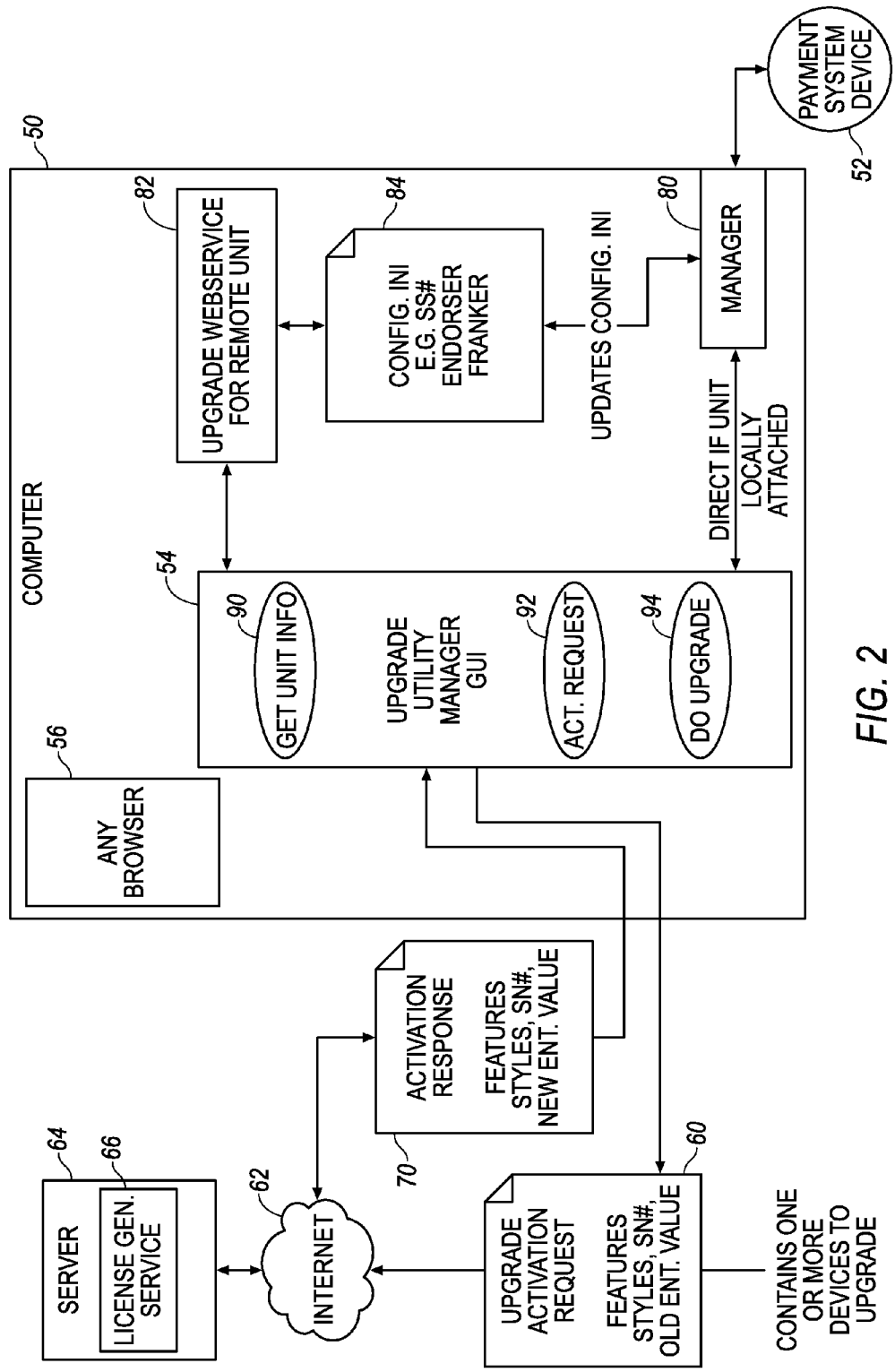
FIG. 2 illustrates a method for controlling feature upgrades in an embodiment of the invention.
Figure 3:
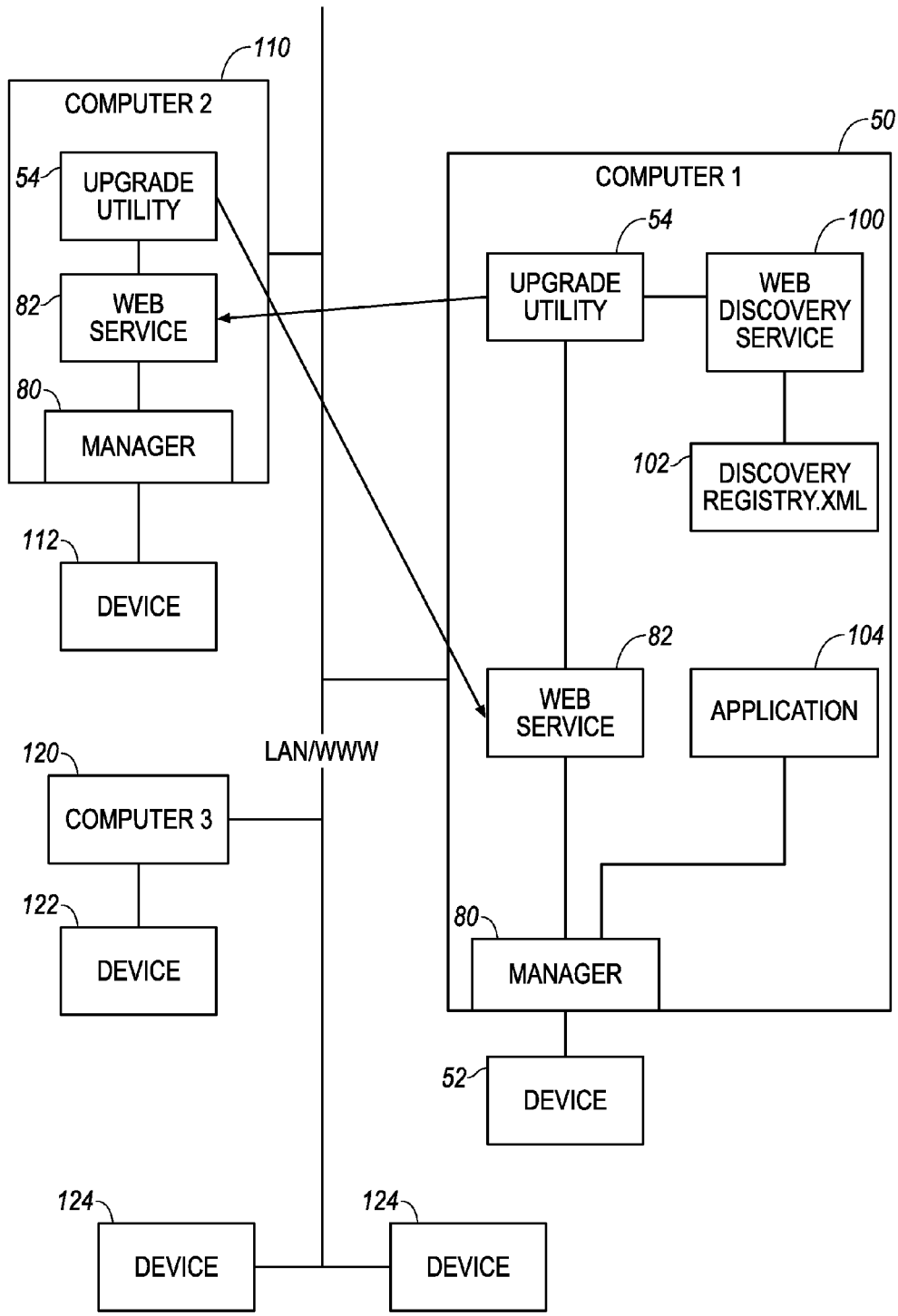
FIG. 3 further illustrates the method for controlling feature upgrades.

The following description is of an example embodiment of the invention, with reference to FIGS. 2 and 3.

The user purchases upgrade options (called upgrade styles) in any quantity that is desired without having to know or provide the serial numbers of the units involved. After purchase of the upgrade options, access to these styles for license activation is available to the user via a secured website. That is, a user may have any number of payment system devices located in a distributed network at various locations and the user wants to upgrade one or more features. For example, an existing payment system device may be capable of receiving a hardware function or feature upgrade, with the upgrade being enabled by providing the payment system device with an appropriate authorization. The user would desire to be able to upgrade the payment system device in the field. A feature upgrade could include, for example, various speed and document hopper related options, and enabling options, such as, color imaging, color printing, and optical character recognition (OCR), or any other option that the device is capable of supporting such as an endorser option. For such upgrades, the payment system device hardware is already capable of the feature; however, the payment system device must receive an authorization or entitlement before the feature is enabled for the particular unit.

An upgrade utility program has been developed to allow a user to communicate with local or remote units and automatically retrieve (block 90) the units' configuration information, serial number, series model, and unit/PC name and display these to the user. These units may also be connected to PCs locally or on a network. In order to communicate remotely, a web-service is developed and installed on each PC that hosts a unit or on the unit itself, where required.

As shown in FIG. 2, a computer 50 is connected to a payment system device 52. The upgrade utility program runs on computer 50, and the upgrade utility program and an associated upgrade utility manager graphical user interface (GUI) are indicated at 54. A suitable Internet browser is indicated at 56. Manager 80 is the interface of computer 50 to payment system device 52. As shown, web service 82 runs on computer 50, and a configuration file 84 (Config.ini) includes information about the configuration of payment system device 52. For a locally attached payment system device 52, the upgrade utility 54 directly accesses manager 80. On the other hand, remote requests, that is, access from a utility upgrade program on a remote unit, is handled by the web service 82.

The utility program 54 provides functions to allow the user to select the units to apply various upgrades to. The current solution includes the creation of an Upgrade Request .xml file which contains the units' serial numbers, configurations, PC names, URLs and selected upgrades to apply. Only valid upgrades, ensured by the utility program, are possible. The file data contains both encrypted and unencrypted data, and employs check-summing methodology to prevent unauthorized manipulation.

This approach of using a file based process is also to allow users with systems not connected to the Internet 62, the ability to transport these files to other systems that are connected to the Internet 62. The user can also use the tool 54 to view a previously generated request file to determine what styles and how many of each are needed.

The secured website, noted earlier, is then accessed by the user to obtain a license activation (Upgrade Response file) to deploy the styles to the units selected. The server, which is a component of the entitlement system, is indicated at 64 and the license generator service is indicated at 66 The user uploads (block 92) the Upgrade Request file (represented at 60) and in return downloads an Upgrade Response file (.xml) (represented at 70) containing the license to deploy the configurations. The uploading and downloading may be performed with the browser 56. During this step, presently, the user identifies the styles that are needed from the order for licensing. A variation for future implementation is, by using the contents of the request file, to automatically (programmatically) identify and retrieve the upgrade styles needed from the order. This response file also contains both encrypted and unencrypted data, and employs check-summing protection to prevent unauthorized manipulation.

Prior to the granting of a license, the License Generator 66 running at the website, decrypts, re-verifies the upgrade request contents, generates a license response and pertinent details (amongst others) like the checksum, order number, serial number and upgrade styles. The quantity of each style applied (used) is stored for use to later update the production database so that the new configurations of the upgraded units are recorded in the database. A variation to the process in which the utility 54 would contact the website directly in real-time (and transparently) to obtain the license authorization and apply it to the device is also an option. An additional option is to allow the user to view the unencrypted contents of the Request or the Response file to see the units and styles being applied.

The user runs the utility program 54 and using the Upgrade Response file can upgrade (block 94) all the units identified in the file or can selectively apply them individually.

In this embodiment, only feature upgrades in increasing configuration value are allowed. As an extension to this methodology feature downgrades are also possible.

FIG. 3 illustrates further details of the example embodiment. Computer 50 is shown, including the upgrade utility 54, manager 80, and web service 82. Computer 50 is directly connected to payment system device 52. When the upgrade utility 54 is run by the user, web discovery service 100 and xml discovery registry 102 may be used to obtain URLs of devices on the network. If the discovery service is not present, URLs may be entered manually.

With continuing reference to FIG. 3, note that the network (local area network or Internet) additionally includes computer 110 connected to device 112, computer 120 connected to device 122, and additional devices 124 (devices 124 either include a computing platform, or are connected to a computer that is not illustrated). In addition, a computer running a manager that knows how to communicate with the devices on the network can also be used to achieve the described upgrade functions.

The user, using the utility program 54, selects device upgrades and the upgrade activation request is provided to the server 64 (FIG. 1) as described above. The server provides the upgrade response, and the utility program is then able to update the various devices in-situ.

The diagrams in FIGS. 2 and 3 illustrate an example embodiment of the invention, with the above description explaining the sequence of actions involved in the upgrade. To further illustrate the sequence of actions involved, FIGS. 4 and 5 illustrate an embodiment of the invention, in block diagram form.

Figure 4:
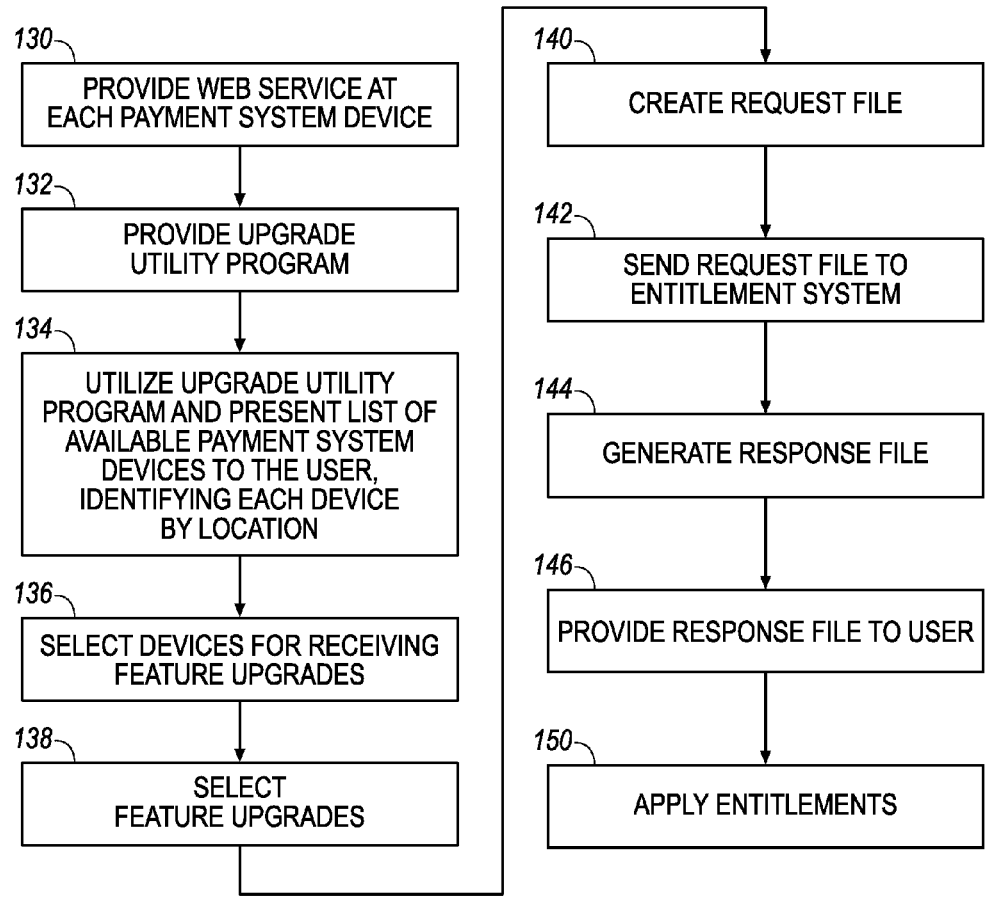
FIG. 4 illustrates, in block diagram form, a method for controlling feature upgrades in an embodiment of the invention.
Figure 5:
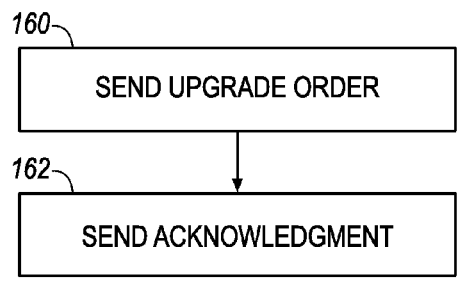
FIG. 5 illustrates, in block diagram form, additional aspects of the method.

With reference primarily to FIG. 4, at block 130, a web service 82 is provided at each of the plurality of payment system devices distributed among the network. The upgrade utility program 54 is provided as depicted at block 132, and is configured to communicate with the web service 82 at each of the plurality of payment system devices.

At block 134 and as exemplified above, the user utilizes the upgrade utility program 54 to communicate with the plurality of payment system devices and present a list of available payment system devices to the user. The list of available payment system devices identifies each device by location, and serial number. At block 136, the user selects a group of payment system devices for receiving feature upgrades, and at block 138 the feature upgrades are selected.

In an embodiment of the invention that utilizes files, as indicated at block 140, a request file is created and contains information indicative of the payment system devices selected for receiving feature upgrades and indicative of the at least one feature upgrade for each selected payment system device.

The request file is then sent to the entitlement system (block 142), and the system generates and provides a response file to the user (blocks 144 and 146). Once the user has the response file, the upgrade utility program 54 is used to apply the entitlements in accordance with the response file.

With reference to FIG. 5, in some embodiments, the user initially places an order for the upgrades prior to creating the request file. When the request file is eventually sent to the entitlement system, the system verifies the request file against the original order. In more detail, at block 160, the user sends an upgrade order to the entitlement system. At block 162, an acknowledgment is sent.

Although embodiments of the invention have been described for use with hardware feature upgrades, it is appreciated that software features could similarly be included for selection and deployment in embodiments of the invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for controlling feature upgrades on a plurality of payment system devices, onsite, in a distributed network, the method comprising:
   providing a web service at each of the plurality of payment system devices;
   providing a program executable by one or more computing processors to communicate with the web service at each of the plurality of payment system devices;
   utilizing the program to communicate with the plurality of payment system devices and present a list of available payment system devices to the user, the list of available payment system devices identifying each device by location;
   selecting a group of payment system devices for receiving feature upgrades;
   for each payment system device in the selected group, selecting at least one feature upgrade; and
   creating by the one or more computing processors, a request file, the request file containing information indicative of the payment system devices selected for receiving feature upgrades and indicative of the at least one feature upgrade for each selected payment system device, sending the request file to an entitlement system; generating a response file containing information indicative of the payment system devices selected for receiving feature upgrades and indicative of entitlements for the at least one feature upgrade for each selected payment system device; and providing the response file to the user.

2. The method of claim 1 further comprising:
   utilizing the program to communicate with the plurality of payment system devices and apply the entitlements for the at least one feature upgrade for each selected payment system device in accordance with the response file.

3. The method of claim 2 wherein the entitlements include hardware feature upgrades supported by the payment system devices, a hardware feature upgrade being enabled for a payment system device upon application of a corresponding entitlement.

4. The method of claim 3 wherein at least one entitlement corresponds to a hardware feature upgrade for a processing speed option.

5. The method of claim 3 wherein at least one entitlement corresponds to a hardware feature upgrade for a document hopper option.

6. The method of claim 3 wherein at least one entitlement corresponds to a hardware feature upgrade for color imaging.

7. The method of claim 3 wherein at least one entitlement corresponds to a hardware feature upgrade for color printing.

8. The method of claim 3 wherein at least one entitlement corresponds to a hardware feature upgrade for optical character recognition.

9. The method of claim 1 further comprising:
   sending an upgrade order to the entitlement system, the upgrade order containing information indicative of at least one feature upgrade; and
   upon receiving the request file at the entitlement system, processing the request file and the upgrade order to produce the response file.

10. The method of claim 9 further comprising:
    receiving the upgrade order at the entitlement system; and
    sending an acknowledgment to the user in response to receiving the upgrade order.

11. The method of claim 9 wherein the upgrade order indicates the at least one feature upgrade without specifying any corresponding payment system device.

12. The method of claim 1 wherein providing the web service at each of the plurality of payment system devices further comprises:
    providing a web service on a computer attached to a payment system device.

13. The method of claim 1 wherein providing the web service at each of the plurality of payment system devices further comprises:
    providing a web service on a payment system device, the payment system device including a computing platform.

* * * * *